US010752124B2

(12) United States Patent
Jung et al.

(10) Patent No.: US 10,752,124 B2
(45) Date of Patent: Aug. 25, 2020

(54) METHOD AND APPARATUS OF CHARGING BATTERY OF VEHICLE USING REGENERATIVE BRAKING

(71) Applicant: Samsung Electronics Co., Ltd., Suwon-si (KR)

(72) Inventors: Daebong Jung, Seongnam-si (KR); YoungJae Kim, Seoul (KR); Younghun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 16/027,593

(22) Filed: Jul. 5, 2018

(65) Prior Publication Data

US 2019/0184843 A1 Jun. 20, 2019

(30) Foreign Application Priority Data

Dec. 14, 2017 (KR) .................. 10-2017-0172240

(51) Int. Cl.
  *B60L 53/60* (2019.01)
  *F16H 61/662* (2006.01)
  *B60L 53/31* (2019.01)

(52) U.S. Cl.
  CPC ............ *B60L 53/60* (2019.02); *B60L 53/31* (2019.02); *F16H 61/662* (2013.01); *B60L 2240/486* (2013.01)

(58) Field of Classification Search
  CPC .... B60L 53/60; B60L 53/31; B60L 2240/486; F16H 61/662
  See application file for complete search history.

(56) References Cited

U.S. PATENT DOCUMENTS

| | | | |
|---|---|---|---|
| 8,054,038 B2 | 11/2011 | Kelty et al. | |
| 8,117,857 B2 | 2/2012 | Kelty et al. | |
| 8,174,231 B2 * | 5/2012 | Sandberg | H02J 7/32 320/104 |
| 8,508,191 B2 | 8/2013 | Kim et al. | |
| 8,618,775 B2 | 12/2013 | Hermann et al. | |
| 8,624,560 B2 | 1/2014 | Ungar et al. | |
| 8,961,203 B2 | 2/2015 | Lee | |
| 8,972,213 B2 | 3/2015 | Zhang et al. | |
| 2009/0256522 A1 | 10/2009 | Pellen | |
| 2016/0236583 A1 | 8/2016 | Kamen et al. | |

FOREIGN PATENT DOCUMENTS

| | | | |
|---|---|---|---|
| JP | 5696654 B2 | 4/2015 | |
| KR | 1998-0009847 U | 4/1998 | |
| KR | 10-0799971 B1 | 2/2008 | |
| KR | 10-2010-0023908 A | 3/2010 | |
| KR | 10-2010-0049113 A | 5/2010 | |
| KR | 10-2015-0109608 A | 10/2015 | |
| KR | 10-2015-0130856 A | 11/2015 | |

\* cited by examiner

*Primary Examiner* — Thomas Ingram
(74) *Attorney, Agent, or Firm* — NSIP Law

(57) ABSTRACT

Provided is a method and apparatus of charging a battery of a vehicle using a regenerative braking. A device for charging a second vehicle using a first vehicle includes a roller apparatus configured to transmit, to the second vehicle, a rotational force generated in response to a rotation of a wheel of the first vehicle; a controller configured to control a gear ratio of the roller apparatus; and a transmission configured to change the gear ratio in response to an instruction of the controller.

20 Claims, 15 Drawing Sheets

METHOD AND APPARATUS OF CHARGING BATTERY OF VEHICLE USING REGENERATIVE BRAKING

CROSS-REFERENCE TO RELATED APPLICATIONS

This application claims the benefit under 35 USC § 119(a) of Korean Patent Application No. 10-2017-0172240 filed on Dec. 14, 2017 in the Korean Intellectual Property Office, the entire disclosure of which is incorporated herein by reference for all purposes.

BACKGROUND

1. Field

The following description relates to charging a battery of a vehicle using a regenerative braking.

2. Description of Related Art

With the increasing awareness of environmental issues and the diminishing energy resource, hybrid vehicle and electric vehicle among are gaining attention as vehicles of the future. The hybrid vehicle and the electric vehicle may use a battery pack including secondary batteries capable of charging and discharging as a main power source.

The lifetime of the battery pack is very important for the hybrid vehicle or the electric vehicle and studies on a method of extending the lifetime of the battery pack have been conducted. For example, larger capacity battery packs have been provided to a vehicle or another vehicle equipped with a generator, have been used to charge a vehicle.

Providing a larger capacity battery pack to the vehicle may increase cost of the battery pack and may also increase a weight of the vehicle. Also, using another vehicle equipped with the generator may require a moving time and a waiting time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a device for charging a second vehicle using a first vehicle, the device including
  a roller apparatus configured to transmit, to the second vehicle, a rotational force generated in response to a rotation of a wheel of the first vehicle, a controller configured to control a gear ratio of the roller apparatus, and a transmission configured to change the gear ratio in response to an instruction of the controller.

The transmission may be configured to be a continuously variable transmission (CVT).

The roller apparatus may be provided in a hollow coaxial structure.

The roller apparatus may include a first roller configured to rotate in response to the rotation of the wheel of the first vehicle, and a second roller configured to rotate a wheel of the second vehicle.

The roller apparatus may include a first inclined plate configured to support the first vehicle, and a second inclined plate configured to support the second vehicle.

The transmission may be provided between the first roller and the second roller.

The transmission may be configured to control a gear ratio between the first roller and the second roller.

The controller may be configured to determine the gear ratio based on a first optimal operation point of the first vehicle and a second optimal operation point of the second vehicle.

The controller may be configured to determine the first optimal operation point based on a motor efficiency map of the first vehicle, and to determine the second optimal operation point based on a motor efficiency map of the second vehicle.

The controller may be configured to determine a middle-speed-and-middle-torque area of the second vehicle as the second optimal operation point, in response to the second vehicle being a hybrid vehicle or an electric vehicle.

The controller may be configured to determine a middle-speed-and-high-torque area of the second vehicle as the second optimal operation point, in response to the second vehicle being a gasoline vehicle or a diesel vehicle.

In another general aspect, there is provided a method of charging a second vehicle using a first vehicle, the method including transmitting a rotational force of the first vehicle to the second vehicle using a roller apparatus, and controlling a gear ratio of the roller apparatus using a transmission.

The transmission may be a continuously variable transmission (CVT).

The roller apparatus may be provided in a hollow coaxial structure.

The roller apparatus may include a first roller configured to rotate in response to a rotation of a wheel of the first vehicle, and a second roller configured to rotate a wheel of the second vehicle.

The roller apparatus may include a first inclined plate configured to support the first vehicle, and a second inclined plate configured to support the second vehicle.

The transmission may be provided between the first roller and the second roller.

The controlling of the gear ratio may include controlling a gear ratio between the first roller and the second roller.

The controlling of the gear ratio may include determining the gear ratio based on a first optimal operation point of the first vehicle and a second optimal operation point of the second vehicle.

The determining of the gear ratio may include determining the first optimal operation point based on a motor efficiency map of the first vehicle, and determining the second optimal operation point based on a motor efficiency map of the second vehicle.

The determining of the gear ratio may include determining a middle-speed-and-middle-torque area of the second vehicle as the second optimal operation point, in response to the second vehicle being a hybrid vehicle or an electric vehicle.

Other features and aspects will be apparent from the following detailed description, the drawings, and the claims.

Figure 1:
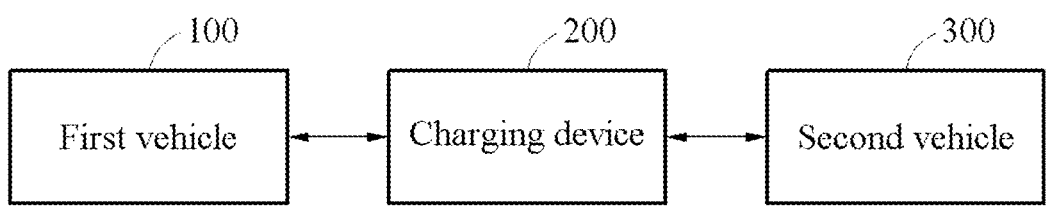
FIG. 1 illustrates an example of a charging apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), and (b) may be used herein to describe components. However, such terms are not used to define an essence, order, or sequence of a corresponding component, but are used merely to distinguish the corresponding component from other components. For example, a component referred to as a first component may be referred to instead as a second component, and another component referred to as a second component may be referred to instead as a first component.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only, and is not intended to limit the disclosure or claims. The singular forms "a," "an," and "the" include the plural forms as well, unless the context clearly indicates otherwise.

Hereinafter, the examples are described with reference to the accompanying drawings. However, the scope of the examples is not limited thereto or restricted thereby. Like reference numerals refer to like elements throughout although they are illustrated in different drawings.

Figure 2:
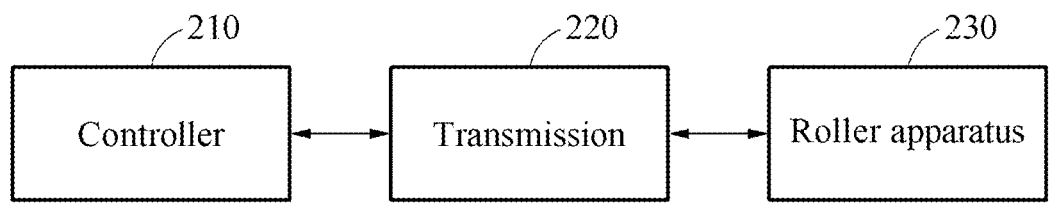
FIG. 2 illustrates an example of a charging device of FIG. 1.

FIG. 1 illustrates an example of a charging apparatus, and FIG. 2 illustrates an example of a charging device of FIG. 1.

Referring to FIGS. 1 and 2, a charging apparatus 10 includes a first vehicle 100, a charging device 200, and a second vehicle 300.

The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, an electric vehicle (EV), a hybrid vehicle, or a drone.

In an example, the first vehicle 100 and the second vehicle 300 is provided on the charging device 200. In an example, the charging device 200 supports the first vehicle 100 and the second vehicle 300. For example, the charging device 200 includes an inclined plate configured to support the first vehicle 100 and the second vehicle 300.

In an example, the first vehicle 100 transmits a rotational force or torque to the second vehicle 300 through the charging device 200. The second vehicle 300 performs charging by applying the rotational force to a regenerative braking. For example, the second vehicle 300 may be a hybrid vehicle or an electric vehicle. The first vehicle 100 may be a hybrid vehicle, an electric vehicle, a gasoline vehicle, or a diesel vehicle. The first vehicle 100 transmits the torque to the second vehicle 300, thus any type of vehicles may be used to charge the second vehicle 300.

As shown in FIG. 2. the charging device 200 includes a controller 210, a transmission 220, and a roller apparatus 230.

The roller apparatus 230 transmits, to the second vehicle 300, a rotational force generated when a wheel of the first vehicle 100 rotates. In an example, the roller apparatus 230 transmits the rotational force of the first vehicle 100 to the second vehicle 300 using a desired gear ratio. For example, the roller apparatus 230 may include a first roller configured to rotate in response to the rotation of the wheel of the first vehicle 100 and a second roller configured to rotate a wheel of the second vehicle 300.

In an example, each of the first roller and the second roller is a roller in a hollow coaxial structure. Accordingly, loss of the rotational force of the first vehicle 100 is minimized and in this state, the rotational force is transmitted to the second vehicle 300. Since each of the first roller and the second roller is provided in the coaxial structure, the portability of the charging device 200 increases.

The controller 210 controls a gear ratio of the roller apparatus 230. In an example, the controller 210 controls the gear ratio based on an optimal operation point. For example, the controller 210 may use a first optimal operation point of the first vehicle 100 and a second optimal operation point of the second vehicle 300.

The optimal operation point may vary for each vehicle. For example, in the case of a hybrid vehicle or an electric vehicle, the optimal operation point may be a middle-speed-and-middle-torque area. In the case of a gasoline vehicle or a diesel vehicle, the optimal operation point may be a middle-speed-and-high-torque area. In an example, the controller 210 determines the optimal operation point based on a type of a vehicle.

In an example, the controller 210 determines the optimal operation point based on a motor efficiency map. The motor efficiency map may include an efficiency, for example, percentage (%), torque, for example, Newton-meter (Nm), and speed, for example, revolution per minute (RPM) of a vehicle. That is, the controller 210 determines the first optimal operation point based on a motor efficiency map of the first vehicle 100 and determines the second optimal operation point based on a motor efficiency map of the second vehicle 300. In an example, the controller 210 may determine the gear ratio based on a ratio between the first optimal operation point and the second optimal operation point.

In an example, the transmission 220 changes the gear ratio in response to an instruction of the controller 210. For example, the transmission 220 may be configured as a continuously variable transmission (CVT). In an example, the transmission 220 transmits the rotational force from the first vehicle 100 to the second vehicle 300 by providing a belt between two rollers, for example, the first roller and the second roller. In an example, the first roller and the second roller may be pulleys. In an example, the transmission 220 infinitely changes the gear ratio by changing a diameter of each roller during a process of transmitting the rotational force. In an example, the transmission 220 may be provided between the first roller and the second roller.

Figure 3:
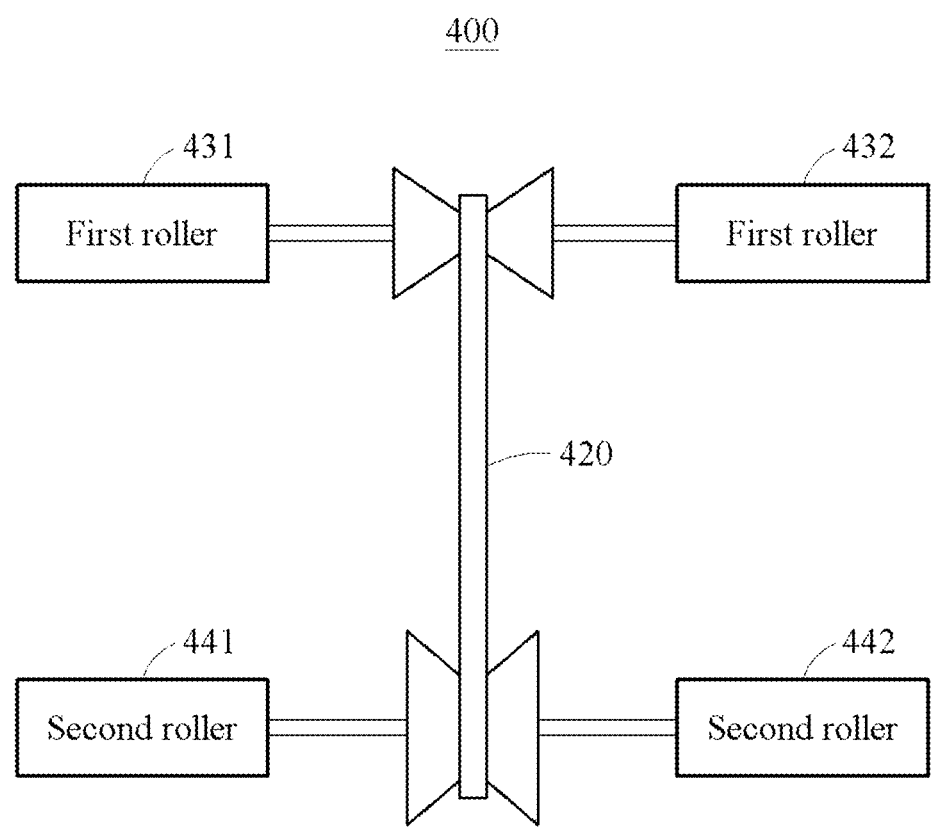
FIG. 3 illustrates an example of a structure of a charging device.

FIG. 3 illustrates an example of a structure of a charging device.

Referring to FIG. 3, a charging device 400 includes a transmission 420 and a roller apparatus.

The roller apparatus includes first rollers 431 and 432 configured to support a first vehicle, and second rollers 441 and 442 configured to support a second vehicle. The first rollers 431 and 432 receive a rotational force from the first vehicle and transmit the rotational force to the transmission 420. In an example, when the first vehicle is a front-wheel-drive vehicle, the first vehicle transmits the rotational force to the first rollers 431 and 432 through front wheels. In an example, when the first vehicle is a rear-wheel-drive vehicle, the first vehicle may transmit the rotational force to the first rollers 431 and 432 through rear wheels. An example in which the first vehicle is a four-wheel-drive vehicle will be described with reference to FIGS. 9A through 11.

The transmission 420 transmits the rotational force to the second rollers 441 and 442 based on a gear ratio set by a controller. The above description with reference to FIGS. 1 and 2 may be applicable to setting of the gear ratio by the controller. In an example, the transmission 420 may be configured as a CVT.

When the second vehicle is a front-wheel-drive vehicle, the second vehicle may receive the rotational force from the second rollers 441 and 442 through front wheels. When the second vehicle is a rear-wheel-drive vehicle, the second vehicle may receive the rotational force from the second rollers 441 and 442 through rear wheels. An example in which the second vehicle is a four-wheel-drive vehicle will be described with reference to FIGS. 9A through 11. In an example, the second vehicle performs charging using a regenerating braking from the transmitted rotational force.

Although not illustrated, the charging device 400 may include a first fixing member configured to fix the first vehicle and a second fixing member configured to fix the second vehicle.

For example, when the first vehicle is a front-wheel-drive vehicle, the first fixing member may fix the rear wheel of the first vehicle. When the first vehicle is a rear-wheel-drive vehicle, the first fixing member may fix the front wheels of the first vehicle. When the first vehicle is a four-wheel-drive vehicle, the first fixing member may fix the front wheels or the rear wheels of the first vehicle.

When the second vehicle is a front-wheel-drive vehicle, the second fixing member may fix the rear wheels of the second vehicle. When the second vehicle is a rear-wheel-drive vehicle, the second fixing member may fix the front wheels of the second vehicle. When the second vehicle is a four-wheel-drive vehicle, the second fixing member may fix the front wheels or the rear wheels of the second vehicle. Thus, the rotational force may be stably transmitted from the first vehicle to the second vehicle using the first fixing member and the second fixing member.

Figure 4:
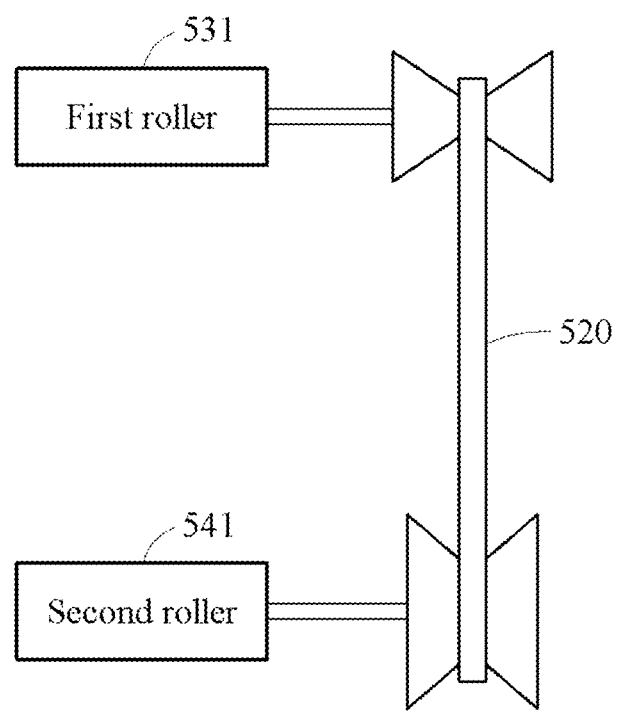
FIG. 4 illustrates an example of a structure of a charging device.

FIG. 4 illustrates an example of a charging device. Referring to FIG. 4, a charging device 500 includes a transmission 520 and a roller apparatus.

The roller apparatus includes a first roller 53 configured to support a first vehicle and a second roller 541 configured to support a second vehicle. In the charging device 500, the transmission 520 is provided at an outside of the first roller 531 and the second roller 541. That is, the first roller 531 may support two wheels of the first vehicle and the second roller 541 may support two wheels of the second vehicle. Accordingly, a rotational force of the first vehicle may be stably transmitted to the second vehicle. In an example, a length of the first roller 531 may be greater than a tread of the first vehicle and a length of the second roller 541 may be greater than a tread of the second vehicle.

The first roller 531 receives the rotational force from the first vehicle and transmits the rotational force to the transmission 520. Here, when the first vehicle is a front-wheel-drive vehicle, the first vehicle may transmit the rotational force to the first roller 531 through front wheels. When the first vehicle is a rear-wheel-drive vehicle, the first vehicle may transmit the rotational force to the first roller 531 through rear wheels. An example in which the first vehicle is a four-wheel-drive vehicle will be described with reference to FIGS. 9A through 11.

The transmission 520 transmits the rotational force to the second roller 541 based on a gear ratio set by a controller. The above description with reference to FIGS. 1 and 2 may be applicable to setting of the gear ratio by the controller. The transmission 520 may be configured as a CVT.

When the second vehicle is a front-wheel-drive vehicle, the second vehicle may receive the rotational force from the second roller 541 through front wheels. When the second vehicle is a rear-wheel-drive vehicle, the second vehicle may receive the rotational force from the second roller 541 through rear wheels. An example in which the second vehicle is a four-wheel-drive vehicle will be described with reference to FIGS. 9A through 11. The second vehicle may perform charging by using a regenerating braking from the transmitted rotational force.

Although not illustrated, the charging device 500 may include a first fixing member configured to fix the first vehicle and a second fixing member configured to fix the second vehicle.

For example, when the first vehicle is a front-wheel-drive vehicle, the first fixing member may fix the rear wheels of the first vehicle. When the first vehicle is a rear-wheel-drive vehicle, the first fixing member may fix the front wheels of the first vehicle. When the first vehicle is a four-wheel-drive vehicle, the first fixing member may fix the front wheels or the rear wheels of the first vehicle.

Also, when the second vehicle is a front-wheel-drive vehicle, the second fixing member may fix the rear wheels of the second vehicle. When the second vehicle is a rear-wheel-drive vehicle, the second fixing member may fix the front wheels of the second vehicle. When the second vehicle is a four-wheel-drive vehicle, the second fixing member may fix the front wheels or the second wheels of the second vehicle. That is, the rotational force may be stably transmitted from the first vehicle to the second vehicle using the first fixing member and the second fixing member.

Figure 5:
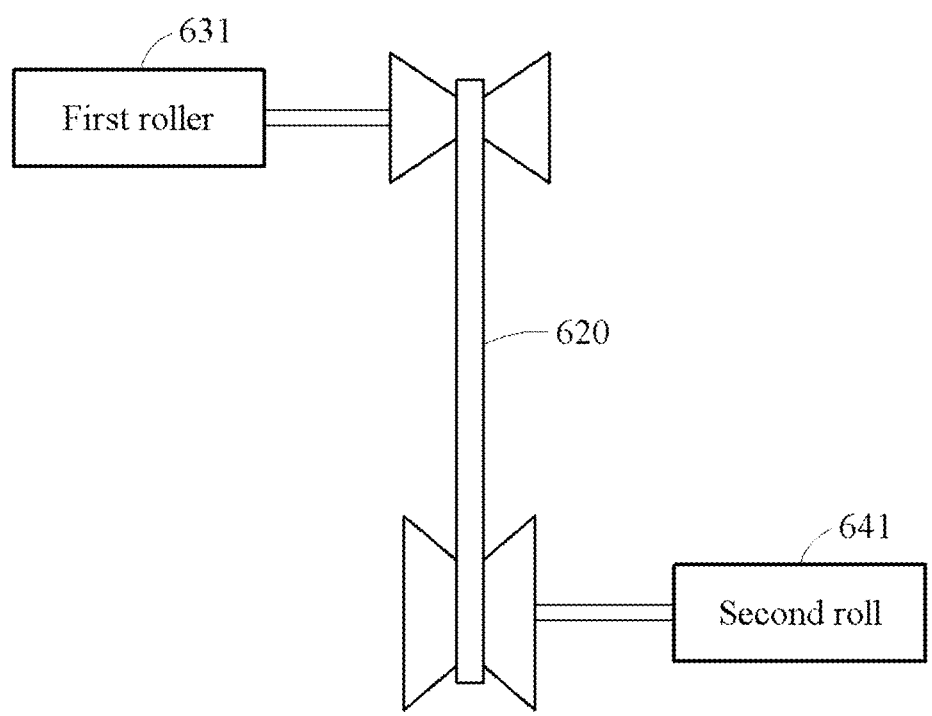
FIG. 5 illustrates an example of a structure of a charging device.

FIG. 5 illustrates another example of a charging device. Referring to FIG. 5, a charging device 600 includes a transmission 620 and a roller apparatus.

The roller apparatus includes a first roller 631 configured to support a first vehicle and a second roller 641 configured to support a second vehicle. In the charging device 600, the first roller 631 and the second roller 641 are provided to diagonally face each other based on the transmission 620. Thus, the charging device 600 may perform charging regardless of the overall length of the first vehicle and the second vehicle.

In an example, the first roller 631 may support two wheels of the first vehicle and the second roller 641 may support two wheels of the second vehicle. Accordingly, a rotational force of the first vehicle may be stably transmitted to the second vehicle. In an example, a length of the first roller 631 may be greater than a tread of the first vehicle and a length of the second roller 641 may be greater than a tread of the second vehicle.

The first roller 631 receives the rotational force from the first vehicle and transmits the rotational force to the transmission 620. In an example, when the first vehicle is a front-wheel-drive vehicle, the first vehicle may transmit the rotational force to the first roller 631 through front wheels. When the first vehicle is a rear-wheel-drive vehicle, the first vehicle may transmit the rotational force to the first roller 631 through rear wheels. An example in which the first vehicle is a four-wheel-drive vehicle will be described with reference to FIGS. 9A through 11.

The transmission 620 transmits the rotational force to the second roller 641 based on a gear ratio set by a controller. The above description with reference to FIGS. 1 and 2 may be applicable to setting of the gear ratio by the controller. The transmission 620 may be configured as a CVT.

When the second vehicle is a front-wheel-drive vehicle, the second vehicle may receive the rotational force from the second roller 641 through front wheels. When the second vehicle is a rear-wheel-drive vehicle, the second vehicle may receive the rotational force from the second roller 641 through rear wheels. An example in which the second vehicle is a four-wheel-drive vehicle will be described with reference to FIGS. 9A through 11. The second vehicle may perform charging using a regenerating braking from the transmitted rotational force.

Although not illustrated, the charging device 600 may further include a first fixing member configured to fix the first vehicle and a second fixing member configured to fix the second vehicle.

For example, when the first vehicle is a front-wheel-drive vehicle, the first fixing member may fix the rear wheel of the first vehicle. When the first vehicle is a rear-wheel-drive vehicle, the first fixing member may fix the front wheel of the first vehicle. When the first vehicle is a four-wheel-drive vehicle, the first fixing member may fix the front wheel or the rear wheel of the first vehicle.

Also, when the second vehicle is a front-wheel-drive vehicle, the second fixing member may fix the rear wheels of the second vehicle. When the second vehicle is a rear-wheel-drive vehicle, the second fixing member may fix the front wheels of the second vehicle. When the second vehicle is a four-wheel-drive vehicle, the second fixing member may fix the front wheels or the second wheels of the second vehicle. Thus, the rotational force may be stably transmitted from the first vehicle to the second vehicle using the first fixing member and the second fixing member.

Figure 6A:
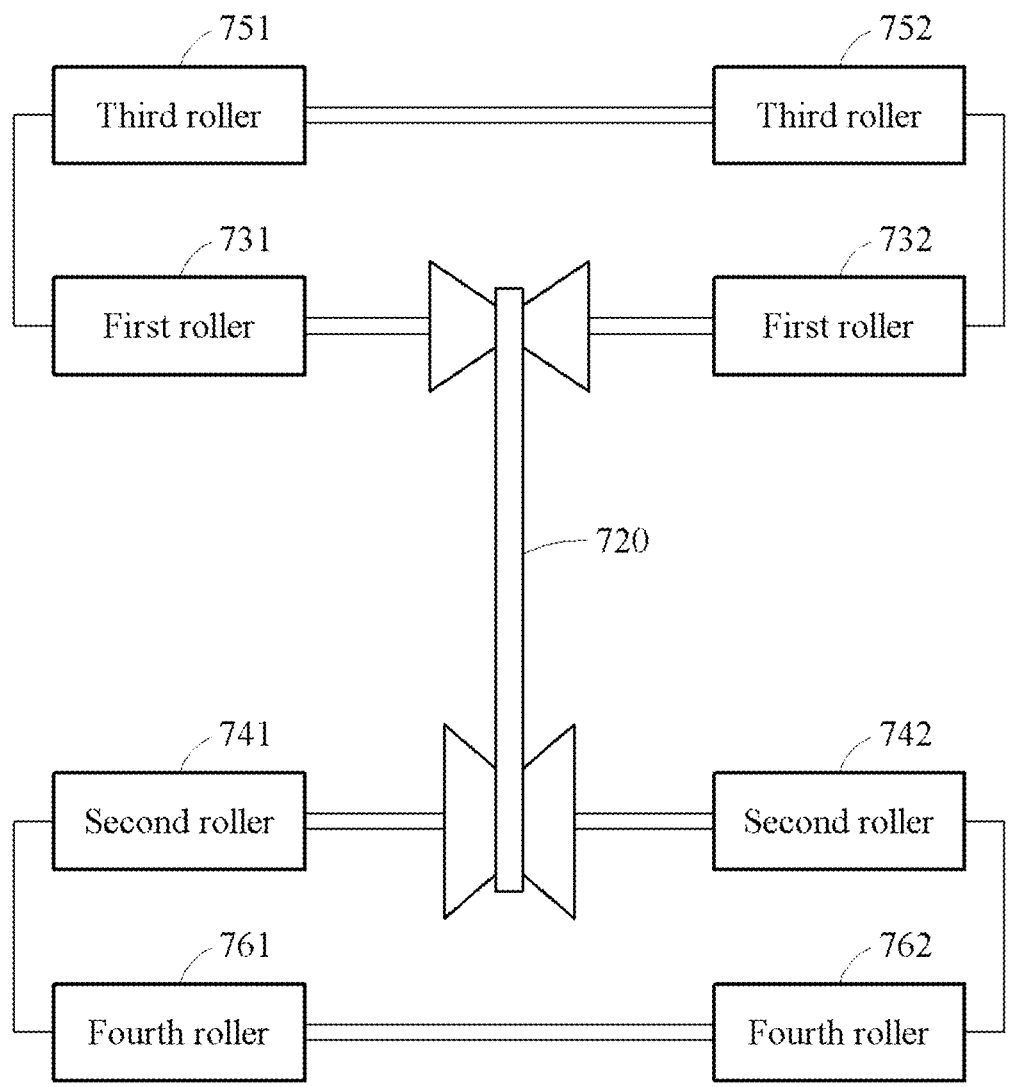
FIG. 6A illustrates an example of a structure of a charging device.
Figure 6B:
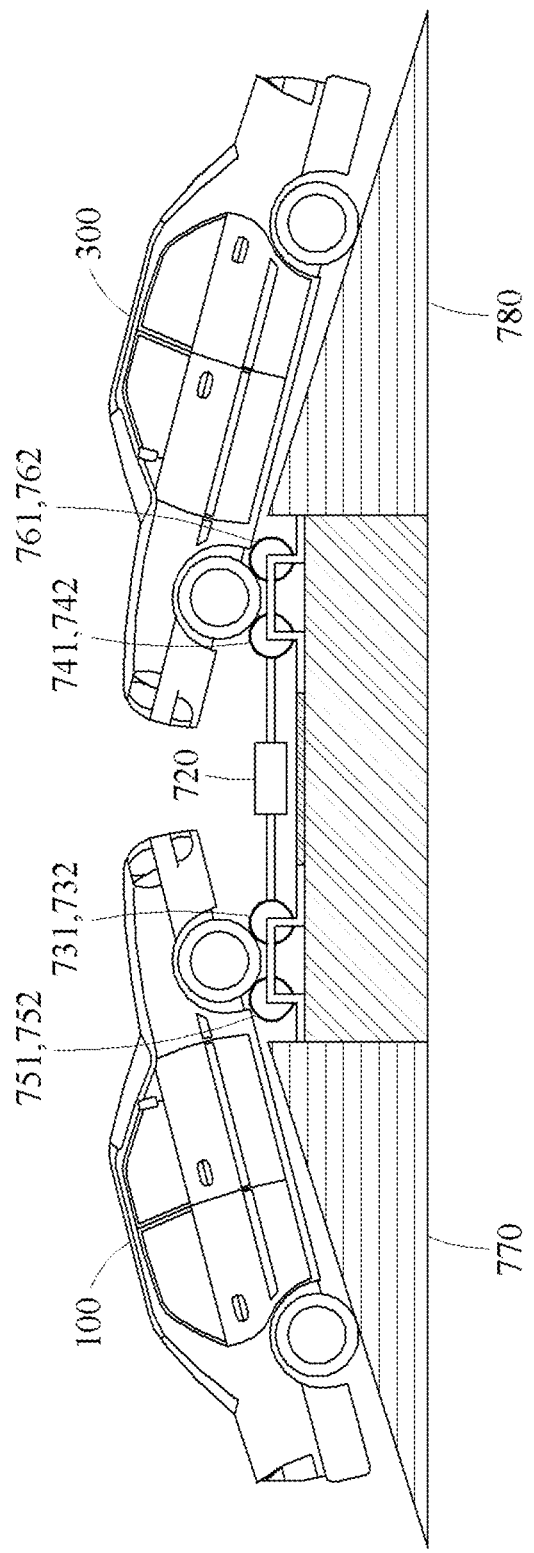
FIG. 6B illustrates an example in which the charging device of FIG. 6A is applied.

FIG. 6A illustrates an example of a structure of a charging device, and FIG. 6B illustrates an example in which the charging device of FIG. 6A is applied.

Referring to FIGS. 6A and 6B, a charging device 700 includes a transmission 720 and a roller apparatus.

The roller apparatus includes first rollers 731 and 732, second rollers 741 and 742, third rollers 751 and 752, and fourth rollers 761 and 762. The roller apparatus further includes a first inclined plate 770 to support a first vehicle 100 and a second inclined plate 780 configured to support a second vehicle 300.

The first inclined plate 770 may support the first vehicle 100 by adjusting a gradient. The second inclined plate 780 may support the second vehicle 300 by adjusting a gradient. For example, the first inclined plate 770 and the second inclined plate 780 may adjust the gradient so that a rotational force of the first vehicle 100 may be optimally transmitted to the second vehicle 300.

The first rollers 731 and 732 and the third rollers 751 and 752 may support the first vehicle 100. Also, the second rollers 741 and 742 and the fourth rollers 761 and 762 may support the second vehicle 300.

The first rollers 731 and 732 receive the rotational force of the first vehicle 100 and transmit the rotational force to the transmission 720. When the first vehicle 100 is a front-wheel-drive vehicle, the first vehicle 100 may transmit the rotational force to the first rollers 731 and 732 through front wheels. When the first vehicle 100 is a rear-wheel-drive vehicle, the first vehicle 100 may transmit the rotational force to the first rollers 731 and 732 through rear wheels. An example in which the first vehicle 100 is a four-wheel-drive vehicle will be described with reference to FIGS. 9A through 11.

The transmission 720 transmits the rotational force to the second rollers 741 and 742 based on a gear ratio set by a controller. The description made above with reference to FIGS. 1 and 2 may be applicable to a configuration of setting, by the controller, the gear ratio. The transmission 720 may be configured as a CVT.

When the second vehicle 300 is a front-wheel-drive vehicle, the second vehicle 300 may receive the rotational force from the second rollers 741 and 742 through front wheels. When the second vehicle 300 is a rear-wheel-drive vehicle, the second vehicle 300 may receive the rotational force from the second rollers 741 and 742 through rear wheels. An example in which the second vehicle 300 is a four-wheel-drive vehicle will be described with reference to FIGS. 9A through 11. The second vehicle 300 may perform charging by using a regenerating braking from the transmitted rotational force.

In an example, the third rollers 751 and 752 serve to support the first vehicle 100 for a stable rotation of wheels of the first vehicle 100. Thus, the third rollers 751 and 752 may be idling in response to the rotation of the wheels of the first vehicle 100.

In an example, the fourth rollers 761 and 762 serve to support the second vehicle 300 for a stable rotation of wheels of the second vehicle 300. Thus, the fourth rollers 761 and 762 may be idling in response to the rotation of the wheels of the second vehicle 300.

For clarity of description, FIG. 6B is described based on a configuration in which the front wheels of the first vehicle 100 and the front wheels of the second vehicle 300 are disposed upward compared to the rear wheels of the first vehicle 100 and the rear wheels of the second vehicle 300, respectively. Other configurations may be used without departing from the spirit and scope of the illustrative examples described. For example, gradients of the first inclined plate 770 and the second inclined plate 780 may be adjusted based on a configuration in which the rear wheels of the first vehicle 100 and the rear wheels of the second vehicle 300 are disposed upward compared to the front wheels of the first vehicle 100 and the front wheels of the second vehicle 300, respectively.

Figure 7:
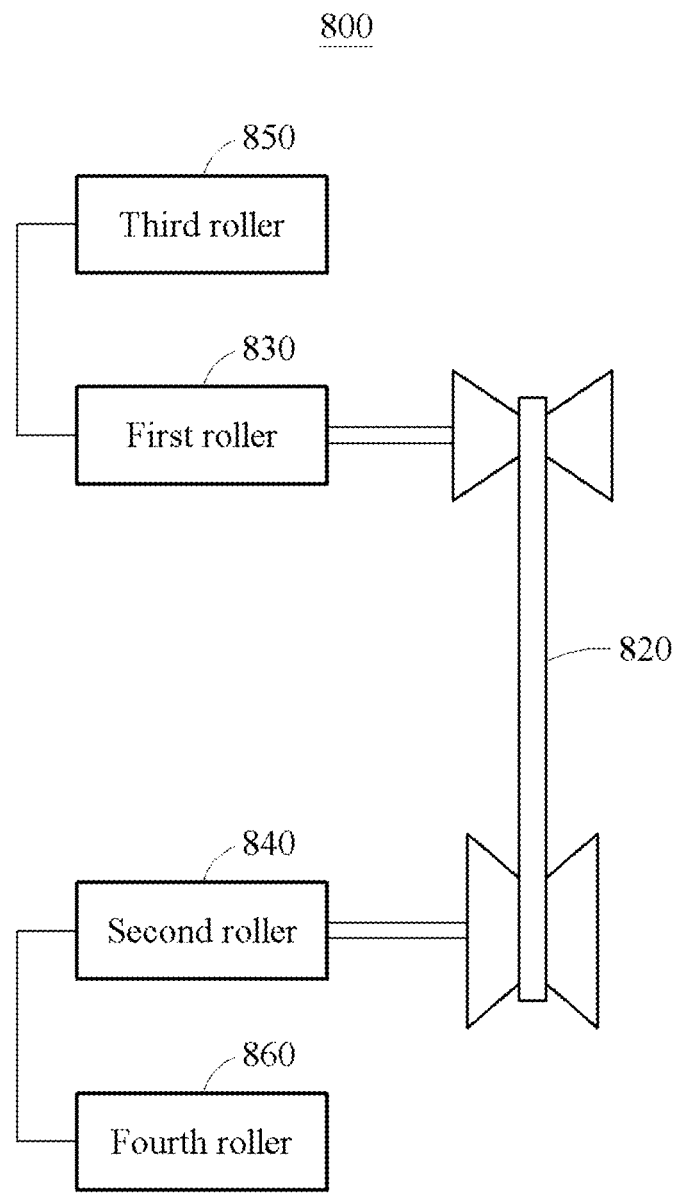
FIG. 7 illustrates an example of a structure of a charging device.

FIG. 7 illustrates an example of a structure of a charging device.

Referring to FIG. 7, a charging device 800 includes a transmission 820 and a roller apparatus.

The roller apparatus includes a first roller 830, a second roller 840, a third roller 850, and a fourth roller 860. Although not illustrated, the roller apparatus may further include a first inclined plate configured to support a first vehicle and a second inclined plate configured to support a second vehicle. The description made above with reference to FIGS. 6A and 6B may be applicable to the first inclined plate and the second inclined plate, and are incorporated herein by reference. Thus, the above description may not be repeated here.

The first roller 830 and the third roller 850 may support the first vehicle. The second roller 840 and the fourth roller 860 may support the second vehicle. In the charging device 800, the transmission 820 is provided at an outside of the first roller 830, the second roller 840, the third roller 850, and the fourth roller 860. Thus, each of the first roller 830 and the third roller 850 may support two wheels of the first vehicle, and each of the second roller 840 and the fourth roller 860 may support two wheels of the second vehicle. Accordingly, a rotational force of the first vehicle may be stably transmitted to the second vehicle. Each of the first roller 830 and the third roller 850 may have a length greater than a tread of the first vehicle, and each of the second roller 840 and the fourth roller 860 may have a length greater than a tread of the second vehicle.

The first roller 830 receives the rotational force from the first vehicle and transmits the rotational force to the transmission 820. Here, when the first vehicle is a front-wheel-drive vehicle, the first vehicle may transmit the rotational force to the first roller 830 through front wheels. When the first vehicle is a rear-wheel-drive vehicle, the first vehicle may transmit the rotational force to the first roller 830 through rear wheels. An example in which the first vehicle is a four-wheel-drive vehicle will be described with reference to FIGS. 9A through 11.

The transmission 820 transmits the rotational force to the second roller 840 based on a gear ratio set by a controller. The above description with reference to FIGS. 1 and 2 may be applicable to setting of the gear ratio by the controller. The transmission 820 may be configured as a CVT.

When the second vehicle is a front-wheel-drive vehicle, the second vehicle may receive the rotational force from the second roller 840 through front wheels. When the second vehicle is a rear-wheel-drive vehicle, the second vehicle may receive the rotational force from the second roller 840 through rear wheels. An example in which the second vehicle is a four-wheel-drive vehicle will be described with reference to FIGS. 9A through 11. The second vehicle may perform charging by using a regenerative braking from the rotational force.

In an example, the third roller 850 serves to support the first vehicle for a stable rotation of wheels of the first vehicle. Thus, the third roller 850 may be idling in response to the rotation of the wheels of the first vehicle.

In an example, the fourth roller 860 serves to support the second vehicle for a stable rotation of wheels of the second vehicle. Thus, the fourth roller 860 may be idling in response to the rotation of the wheels of the second vehicle.

Figure 8:
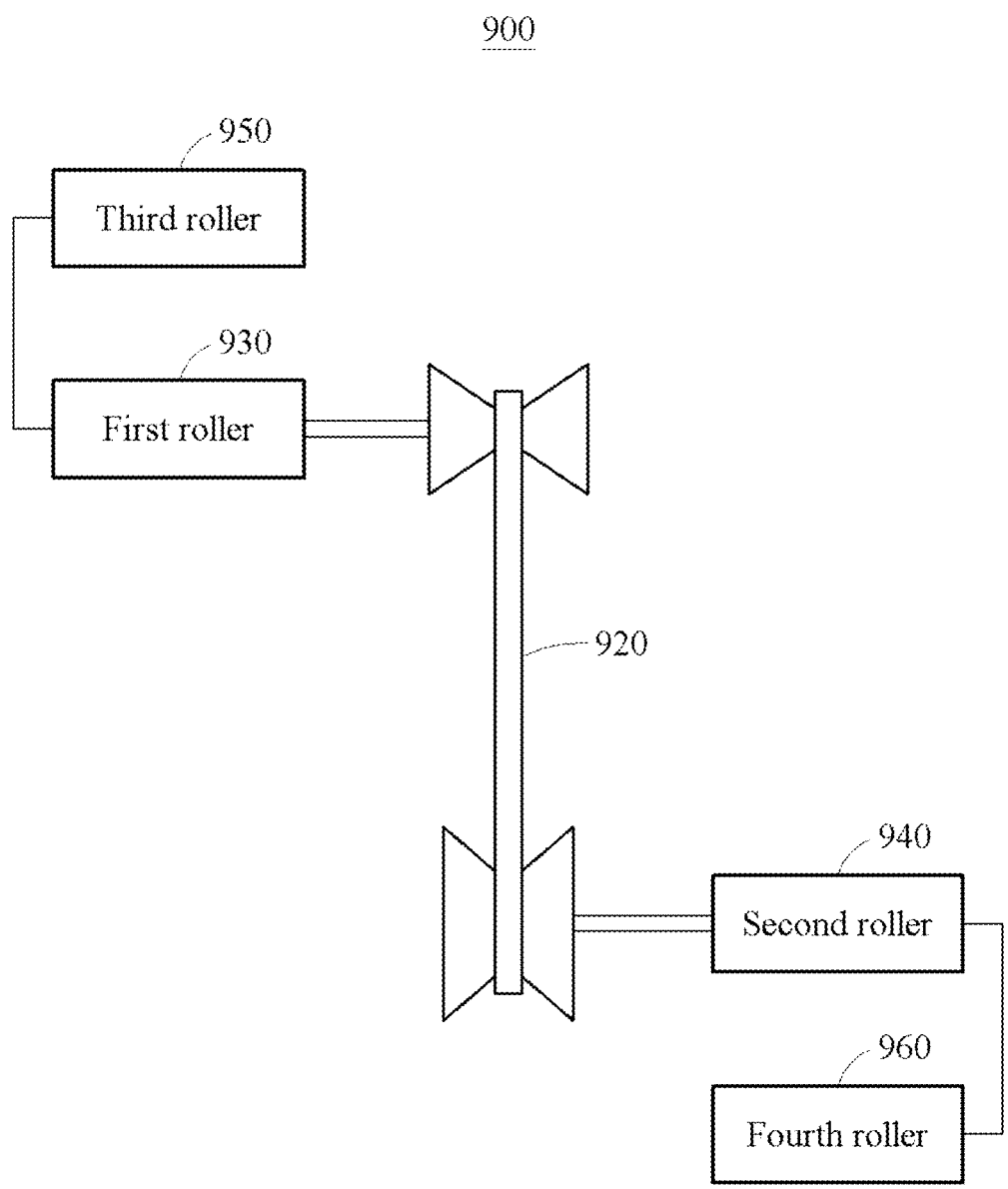
FIG. 8 illustrates an example of a structure of a charging device.

FIG. 8 illustrates another example of a structure of a charging device.

Referring to FIG. 8, a charging device 900 includes a transmission 920 and a roller apparatus.

The roller apparatus includes a first roller 930, a second roller 940, a third roller 950, and a fourth roller 960. Although not illustrated, the roller apparatus may further include a first inclined plate configured to support a first vehicle and a second inclined plate configured to support a second vehicle. The description made above with reference to FIGS. 6A and 6B may be applicable to the first inclined plate and the second inclined plate, and are incorporated herein by reference. Thus, the above description may not be repeated here.

The first roller 930 and the third roller 950 may support the first vehicle. Also, the second roller 940 and the fourth roller 960 may support the second vehicle. In the charging device 900, the first roller 930 and the third roller 950 are provided to diagonally face the second roller 940 and the fourth roller 960 based on the transmission 920. Thus, the charging device 900 may perform charging regardless of the overall length of the first vehicle and the second vehicle. Also, each of the first roller 930 and the third roller 950 may have a length greater than a tread of the first vehicle, and each of the second roller 940 and the fourth roller 960 may have a length greater than a tread of the second vehicle.

The first roller 930 receives a rotational force from the first vehicle and transmits the rotational force to the transmission 920. When the first vehicle is a front-wheel-drive vehicle, the first vehicle may transmit the rotational force to the first roller 930 through front wheels. When the first vehicle is a rear-wheel-drive vehicle, the first vehicle may transmit the rotational force to the first roller 930 through rear wheels. An example in which the first vehicle is a four-wheel-drive vehicle will be described with reference to FIGS. 9A through 11.

The transmission 920 transmits the rotational force to the second roller 940 based on a gear ratio set by a controller. The above description with reference to FIGS. 1 and 2 may be applicable to setting of the gear ratio by the controller. The transmission 920 may be configured as a CVT.

When the second vehicle is a front-wheel-drive vehicle, the second vehicle may receive the rotational force from the second roller 940 through front wheels. When the second vehicle is a rear-wheel-drive vehicle, the second vehicle may receive the rotational force from the second roller 940 through rear wheels. An example in which the second vehicle is a four-wheel-drive vehicle will be described with reference to FIGS. 9A through 11. The second vehicle may perform charging by using a regenerating braking from the transmitted rotational force.

The third roller 950 serves to support the first vehicle for a stable rotation of wheels of the first vehicle. Thus, the third roller 950 may be idling in response to a rotation of the wheels of the first vehicle.

The fourth roller 960 serves to support the second vehicle for a stable rotation of wheels of the second vehicle. Thus, the fourth roller 960 may be idling in response to the rotation of the wheels of the second vehicle.

Figure 9A:
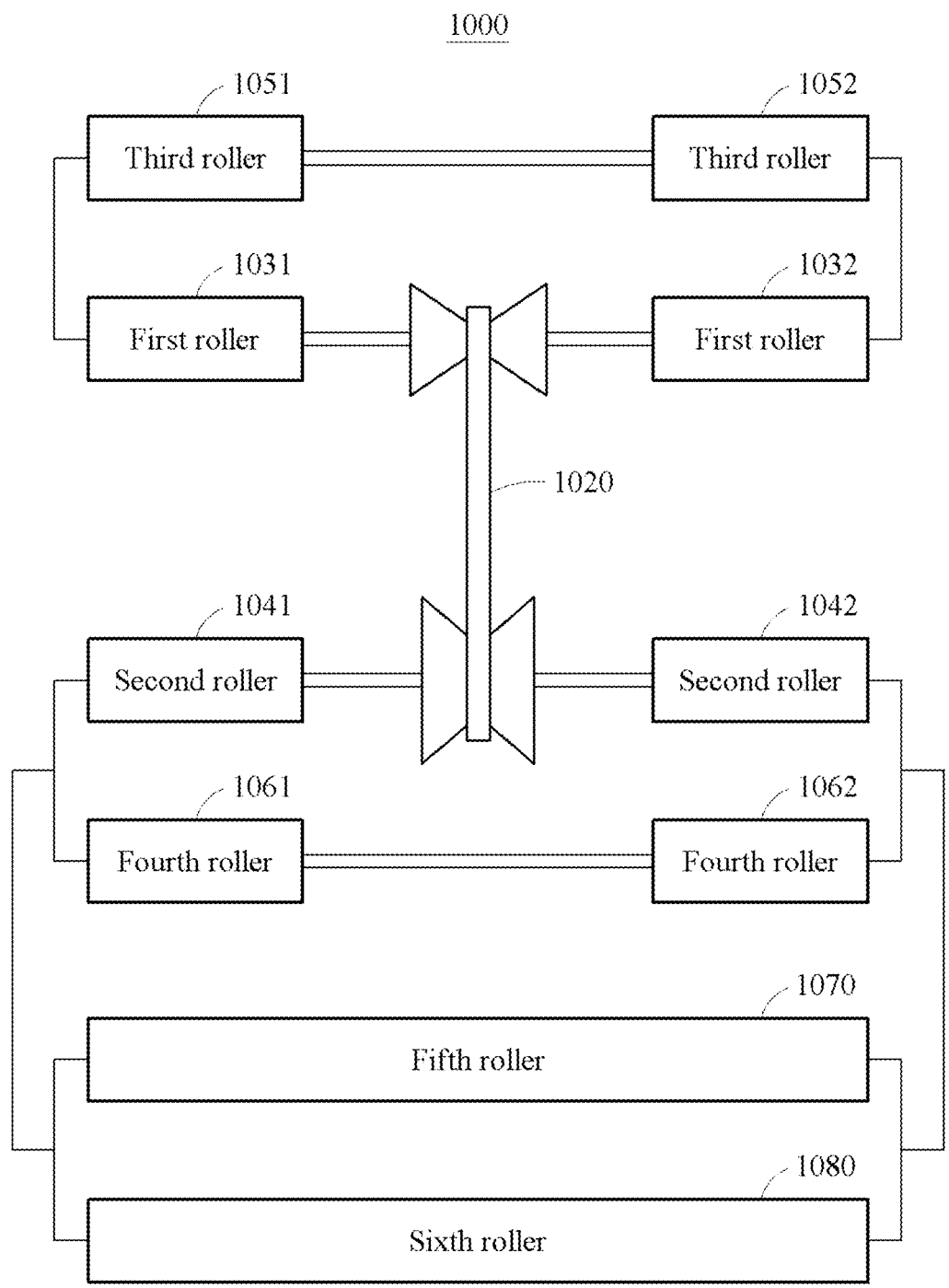
FIG. 9A illustrates an example of a charging device.
Figure 9B:
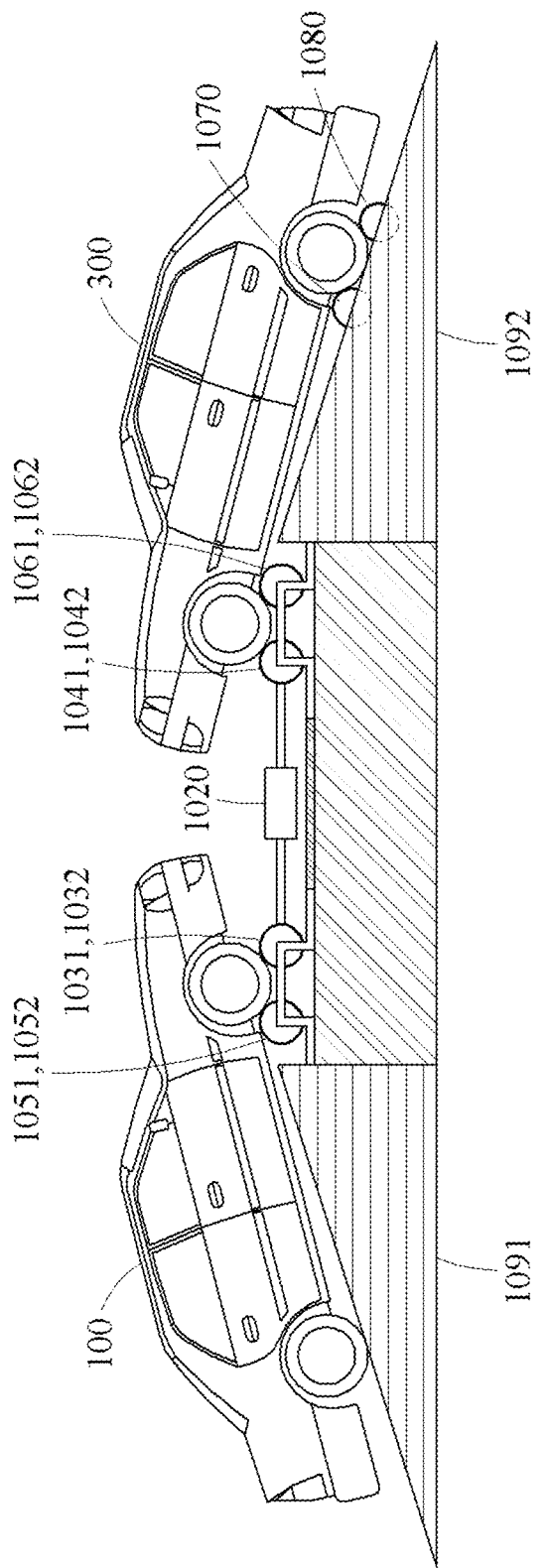
FIG. 9B illustrates an example in which the charging device of FIG. 9A is applied.

FIG. 9A illustrates an example of a charging device, and FIG. 9B illustrates an example in which the charging device of FIG. 9A is applied.

Referring to FIGS. 9A and 9B, a charging device 1000 may be a charging device in an example in which a second vehicle 300 is a four-wheel-drive vehicle. The charging device 1000 includes a transmission 1020 and a roller apparatus.

The roller apparatus includes first rollers 1031 and 1032, second rollers 1041 and 1042, third rollers 1051 and 1052, fourth rollers 1061 and 1062, a fifth roller 1070, and a sixth roller 1080. The roller apparatus further includes a first inclined plate 1091 configured to support a first vehicle 100 and a second inclined plate 1092 configured to support a second vehicle 300.

The first inclined plate 1091 may support the first vehicle 100 by adjusting a gradient. The second inclined plate 1092 may support the second vehicle 300 by adjusting a gradient. For example, the first inclined plate 1091 and the second inclined plate 1092 may adjust the gradient so that a rotational force of the first vehicle 100 may be optimally transmitted to the second vehicle 300.

The first rollers 1031 and 1032 and the third rollers 1051 and 1052 may support the first vehicle 100. Also, the second rollers 1041 and 1042, the fourth rollers 1061 and 1062, the fifth roller 1070, and the sixth roller 1080 may support the second vehicle 300.

The first rollers 1031 and 1032 receive the rotational force from the first vehicle 100 and transmit the rotational force to the transmission 1020. Here, when the first vehicle 100 is a front-wheel-drive vehicle, the first vehicle 100 may transmit the rotational force to the first rollers 1031 and 1032 through front wheels. When the first vehicle 100 is a rear-wheel-drive vehicle, the first vehicle 100 may transmit the rotational force to the first rollers 1031 and 1032 through rear wheels. When the first vehicle 100 is a four-wheel-drive vehicle, the first inclined plate 1091 may include an additional roller capable of rotating a wheel. For example, the first inclined plate 1091 may include an additional roller as one, for example, the fifth roller 1070 and the sixth roller 1080, applied to the second inclined plate 1092.

The transmission 1020 transmits the rotational force to the second rollers 1041 and 1042 based on a gear ratio set by a controller. The above description with reference to FIGS. 1 and 2 may be applicable to setting of the gear ratio by the controller. The transmission 1020 may be configured as a CVT.

Here, since the second vehicle 300 is a four-wheel-drive vehicle, the second vehicle 300 may receive the rotational force from the second rollers 1041 and 1042 through the front wheels or the rear wheels. When the second vehicle 300 receives the rotational force from the second rollers 1041 and 1042 through the front wheels, the rear wheels of the second vehicle 300 may be idling on the fifth roller 1070 and the sixth roller 1080. The second vehicle 300 may perform charging using a regenerative braking from the transmitted rotational force.

The third rollers 1051 and 1052 serve to support the first vehicle 100 for a stable rotation of wheels of the first vehicle 100. Thus, the third rollers 1051 and 1052 may be idling in response to the rotation of the wheels of the first vehicle 100.

The fourth rollers 1061 and 1062 serve to support the second vehicle 300 for a stable rotation of wheels of the second vehicle 300. Thus, the fourth rollers 1061 and 1062 may be idling in response to the rotation of the wheels of the second vehicle 300.

For clarity of description, FIGS. 9A and 9B are described based on an example in which the second vehicle 300 is a four-wheel-drive vehicle. However, it is provided as an example only. Examples may be expanded using an additional roller, such as the fifth roller 1070 and the sixth roller 1080, although the first vehicle 100 is a four-wheel-drive vehicle or all of the first vehicle 100 and the second vehicle 300 are four-wheel-drive vehicles.

In addition, for clarity of description, FIG. 9B is described based on a configuration in which the front wheels of the first vehicle 100 and the front wheels of the second vehicle 300 are disposed upward compared to the rear wheels of the first vehicle 100 and the rear wheels of the second vehicle 300, respectively. However, it is provided as an example only. Gradients of the first inclined plate 1091 and the second inclined plate 1092 may be adjusted based o a configuration in which the rear wheels of the first vehicle 100 and the rear wheels of the second vehicle 300 are disposed upward compared to the front wheels of the first vehicle 100 and the front wheels of the second vehicle 300, respectively.

Figure 10:
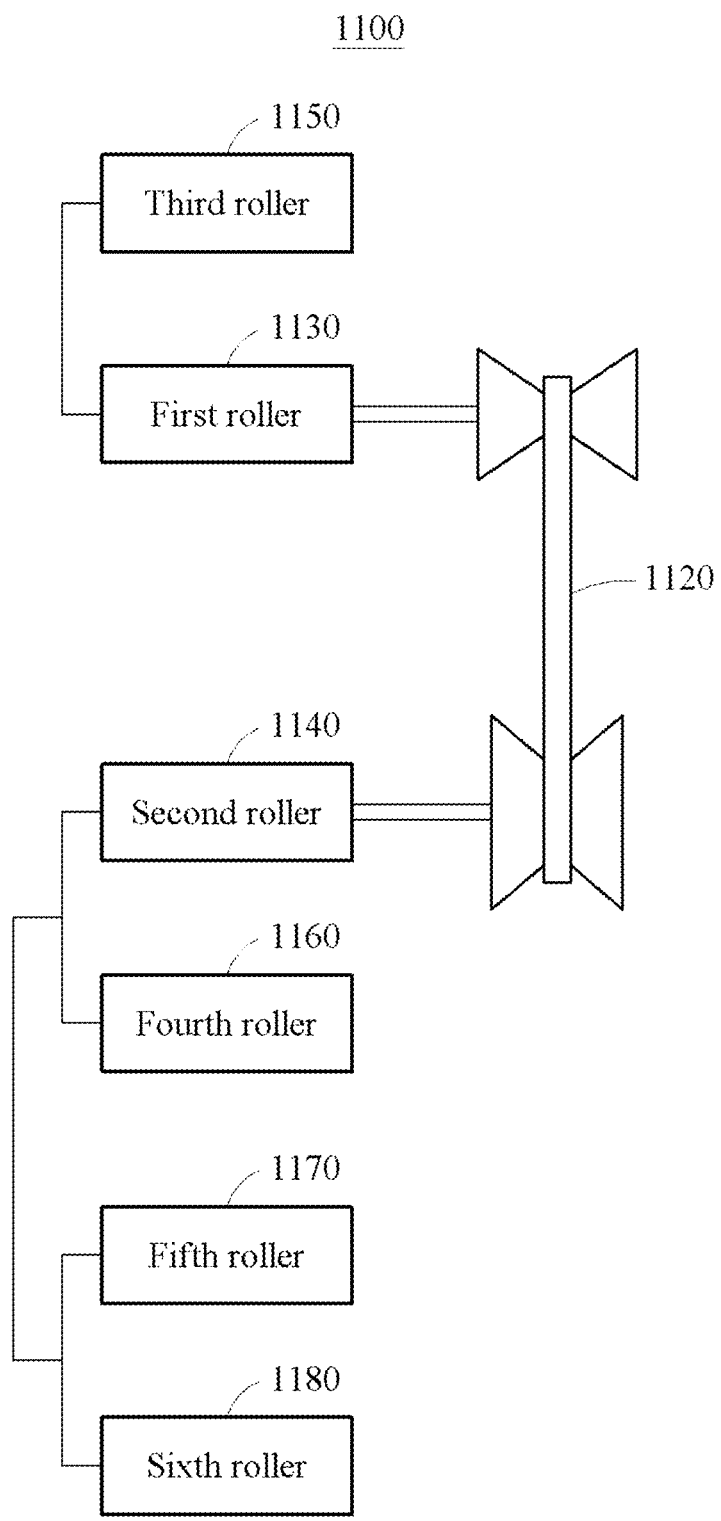
FIG. 10 illustrates an example of a charging device.

FIG. 10 illustrates an example of a structure of a charging device.

Referring to FIG. 10, a charging device 1100 may be a charging device in an example in which a second vehicle is a four-wheel-drive vehicle. The charging device 1100 includes a transmission 1120 and a roller apparatus.

The roller apparatus includes a first roller 1130, a second roller 1140, a third roller 1150, a fourth roller 1160, a fifth roller 1170, and a sixth roller 1180. Although not illustrated, the roller apparatus may further include a first inclined plate configured to support a first vehicle and a second inclined plate configured to support the second vehicle. The description made above with reference to FIGS. 6A and 6B may be applicable to the first inclined plate and the second inclined plate, and are incorporated herein by reference. Thus, the above description may not be repeated here.

The first roller 1130 and the third roller 1150 may support the first vehicle. Also, the second roller 1140, the fourth roller 1160, the fifth roller 1170, and the sixth roller 1180 may support the second vehicle. Here, in the charging device 1100, the transmission 1120 is provided at an outside of the first roller 1130, the second roller 1140, the third roller 1150, the fourth roller 1160, the fifth roller 1170, and the sixth roller 1180. That is, each of the first roller 1130 and the third roller 1150 may support two wheels of the first vehicle, and each of the second roller 1140, the fourth roller 1160, the fifth roller 1170, and the sixth roller 1180 may support two wheels of the second vehicle. Accordingly, the rotational force of the first vehicle may be stably transmitted to the second vehicle. Also, each of the first roller 1130 and the third roller 1150 may have a length greater than a tread of the first vehicle. Each of the second roller 1140, the fourth roller 1160, the fifth roller 1170, and the sixth roller 1180 may have a length greater than a tread of the second vehicle.

The first roller 1130 receives the rotational force from the first vehicle and transmits the rotational force to the transmission 1120. Here, when the first vehicle is a front-wheel-drive vehicle, the first vehicle may transmit the rotational force to the first roller 1130 through front wheels. When the first vehicle is a rear-wheel-drive vehicle, the first vehicle may transmit the rotational force to the first roller 1130 through rear wheels. When the first vehicle is a four-wheel-drive vehicle, the first inclined plate may include an additional roller capable of rotating a wheel. For example, the first inclined plate may further include an additional roller such as, for example, the fifth roller 1170 and the sixth roller 1180, applied to the second inclined plate.

The transmission 1120 transmits the rotational force to the second roller 1140 based on a gear ratio set by a controller. The above description with reference to FIGS. 1 and 2 may be applicable to setting of the gear ratio by the controller. The transmission 1120 may be configured as a CVT.

Here, since the second vehicle is a four-wheel-drive vehicle, the second vehicle may receive the rotational force from the second roller 1140 through the front wheels or the rear wheels. When the second vehicle receives the rotational force from the second roller 1140 through the front wheels, the rear wheels of the second vehicle may be idling through the fifth roller 1170 and the sixth roller 1180. The second vehicle may perform charging using a regenerative braking from the transmitted rotational force.

The third roller 1150 serves to support the first vehicle for a stable rotation of wheels of the first vehicle. Thus, the third roller 1150 may be idling in response to the rotation of the wheels of the first vehicle.

The fourth roller 1160 serves to support the second vehicle for a stable rotation of wheels of the second vehicle. That is, the fourth roller 1160 may be idling in response to the rotation of the wheels of the second vehicle.

Figure 11:
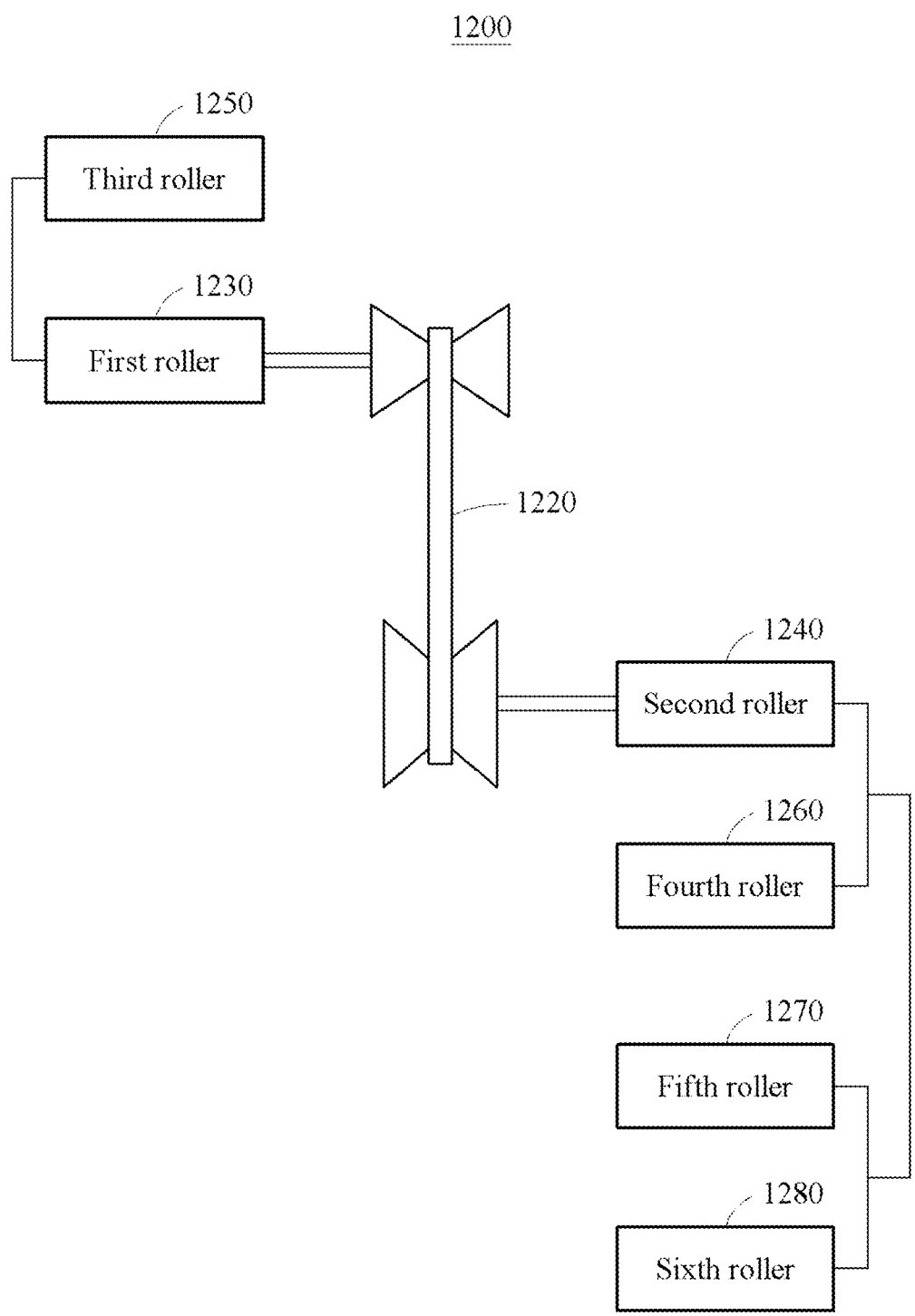
FIG. 11 illustrates an example of a charging device.

FIG. 11 illustrates an example of a charging device.

Referring to FIG. 11, a charging device 1200 may be a charging device in an example in which a second vehicle is a four-wheel-drive vehicle. The charging device 1200 includes a transmission 1220 and a roller apparatus.

The roller apparatus includes a first roller 1230, a second roller 1240, a third roller 1250, a fourth roller 1260, a fifth roller 1270, and a sixth roller 1280. Although not illustrated, the roller apparatus may further include a first inclined plate configured to support a first vehicle and a second inclined plate configured to support the second vehicle. The description made above with reference to FIGS. 6A and 6B may be applicable to the first inclined plate and the second inclined plate, and are incorporated herein by reference. Thus, the above description may not be repeated here.

The first roller 1230 and the third roller 1250 may support the first vehicle. Also, the second roller 1240, the fourth roller 1260, the fifth roller 1270, and the sixth roller 1280 may support the second vehicle. In the charging device 1200, the first roller 1230 and the third roller 1250 are provided to diagonally face the second roller 1240, the fourth roller 1260, the fifth roller 1270, and the sixth roller 1280 across the transmission 1220. That is, the charging device 1200 may perform charging regardless of the overall length of the first vehicle and the second vehicle. In an example, each of the first roller 1230 and the third roller 1250 may have a length greater than a tread of the first vehicle. Each of the second roller 1240, the fourth roller 1260, the fifth roller 1270, and the sixth roller 1280 may have a length greater than a tread of the second vehicle.

The first roller 1230 receives a rotational force from the first vehicle and transmits the rotational force to the transmission 1220. When the first vehicle is a front-wheel-drive vehicle, the first vehicle may transmit the rotational force to the first roller 1230 through front wheels. When the first vehicle is a rear-wheel-drive vehicle, the first vehicle may transmit the rotational force to the first roller 1230 through rear wheels. When the first vehicle is a four-wheel-drive vehicle, the first inclined plate may include an additional roller capable of rotating a wheel. For example, the first inclined plate may further include an additional roller such one, for example, the fifth roller 1270, and the sixth roller 1280, applied to the second inclined plate.

The transmission 1220 transmits the rotational force to the second roller 1240 based on a gear ratio set by a controller. The above description with reference to FIGS. 1 and 2 may be applicable to setting of the gear ratio by the controller. The transmission 1220 may be configured as a CVT.

Since the second vehicle is a four-wheel-drive vehicle, the second vehicle may receive the rotational force from the second roller 1240 through the front wheels or from the fifth roller 1270 through the rear wheels. When the second vehicle receives the rotational force from the second roller 1240 through the front wheels, the rear wheels of the second vehicle may be idling through the fifth roller 1270 and the sixth roller 1280. The second vehicle may perform charging using a regenerative braking from the transmitted rotational force.

The third roller 1250 serves to support the first vehicle for a stable rotation of wheels of the first vehicle. Thus, the third roller 1250 may be idling in response to the rotation of the wheels of the first vehicle.

The fourth roller 1260 serves to support the second vehicle for a stable rotation of the wheels of the second vehicle. Thus, the fourth roller 1260 may be idling in response to the rotation of the wheels of the second vehicle.

Figure 12:
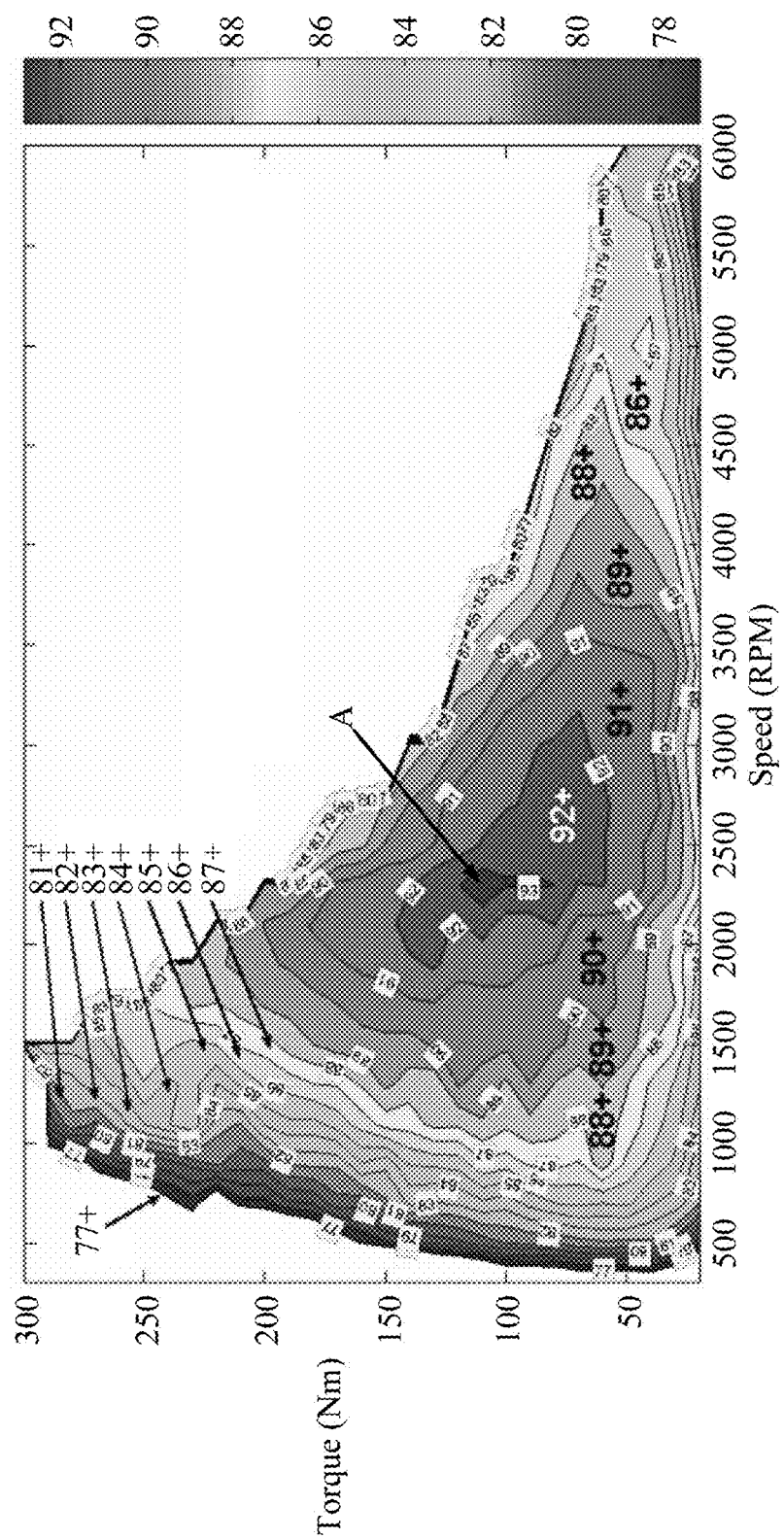
FIG. 12 illustrates an example of a motor efficiency map of a first vehicle.
Figure 13:
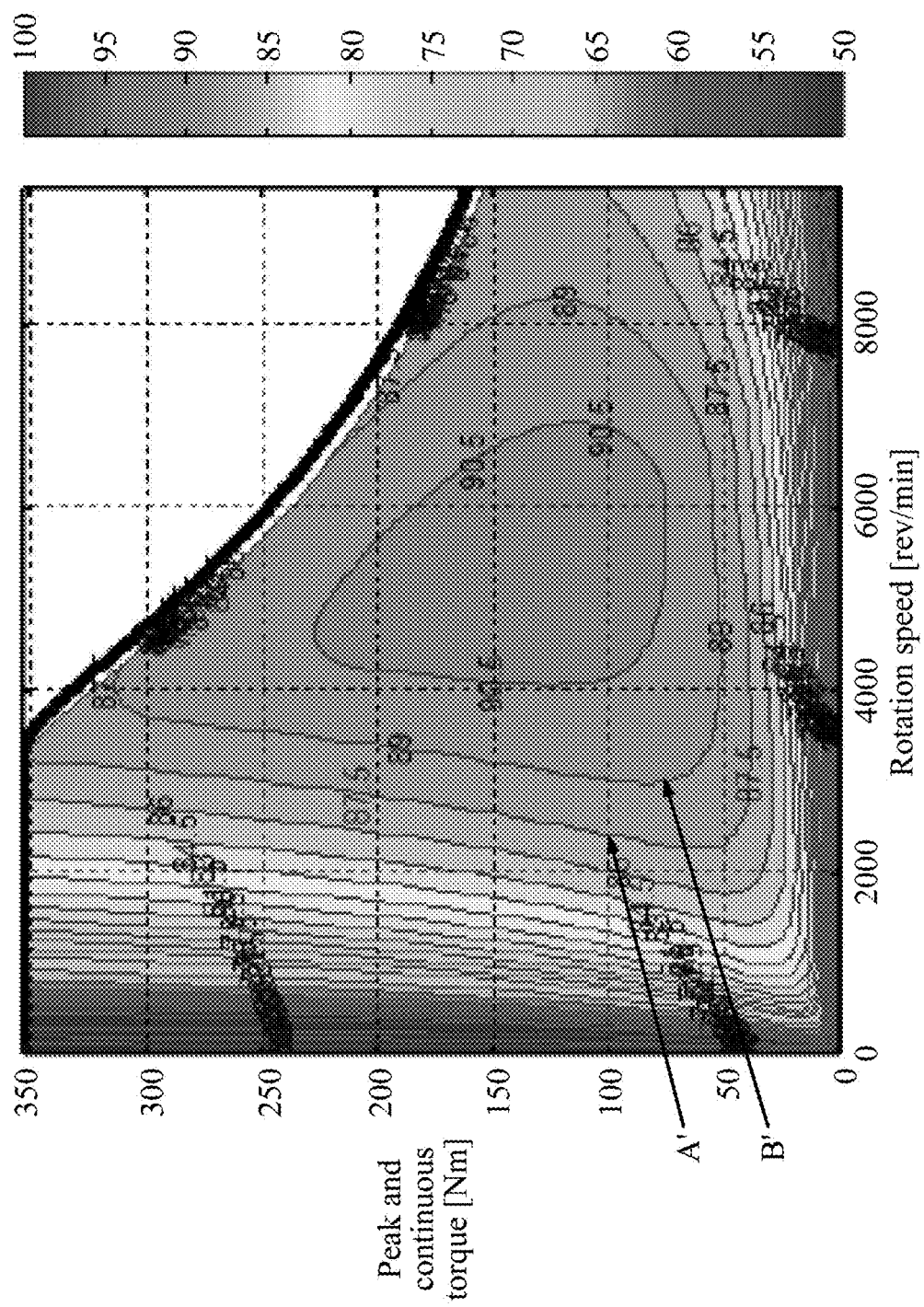
FIG. 13 illustrates an example of a motor efficiency map of a second vehicle.

FIG. 12 illustrates an example of a motor efficiency map of a first vehicle, and FIG. 13 illustrates an example of a motor efficiency map of a second vehicle.

Referring to FIGS. 1, 2, 12, and 13, a configuration in which the controller 210 determines a gear ratio of the roller apparatus 230 may be verified.

The controller 210 may control the gear ratio of the roller apparatus 230 to operate each of the first vehicle 100 and the second vehicle 300 at a corresponding optimal operation point. The controller 210 may control the gear ratio of the roller apparatus 230 using the transmission 220. The transmission 220 may be configured as a CVT and may infinitely change the gear ratio.

The controller 210 may determine the gear ratio based on an optimal operation point, for example, a first optimal operation point A, of the first vehicle 100 and an optimal operation point, for example, a second optimal operation point B', of the second vehicle 300.

For example, the controller 210 may determine the first optimal operation point A based on a motor efficiency map of the first vehicle 100, and may determine the second optimal operation point B' based on a motor efficiency map of the second vehicle 300.

Referring to FIG. 12, the optimal operation point of the first vehicle 100 may be identical to the first optimal operation point A. That is, the first vehicle 100 may operate at 100 Nm at 22.5 kWh, i.e., at the first optimal operation point A of 2250 RPM.

Referring to FIG. 13, the optimal operation point of the second vehicle 300 may be identical to the second optimal operation point B'. If gear ratio=1, the second vehicle 300 may operate at an operation point N. Accordingly, the controller 210 may control the gear ratio of the roller apparatus 230 to be 0.75 (=75/100 [Nm]=2250/3000 [RPM]) so that the second vehicle 300 may operate at 75 Nm at 22.5 kWh, i.e., at the second optimal operation point B' of 3000 RPM. Thus, the controller 210 may control the gear ratio to minimize loss of a rotational force of the first vehicle 100 and to enhance a charging efficiency of the second vehicle 300.

If a wheel size of the first vehicle 100 is different from that of the second vehicle 300, the controller 210 may correct the determined gear ratio. The wheel size may indicate, for example, a radius, a diameter, or a circumference, of a wheel. For example, if the wheel size of the first vehicle 100 is greater by d folds than that of the second vehicle 300, the controller 210 may correct the gear ratio to be 0.75 d and may determine 0.75 d as the gear ratio.

In an example of a hybrid vehicle or an electric vehicle, the controller 210 may determine a middle-speed-and-middle-torque area as the optimal operation point. In an example of a diesel vehicle or a gasoline vehicle, the controller 210 may determine a middle-speed-and-high-torque area as the optimal operation point. A middle speed refers to an intermediate area of a maximum speed of a vehicle, a middle torque refers to an intermediate area of a maximum torque of the vehicle, and a high torque refers to an area close to the maximum torque of the vehicle. The controller 210 may determine the optimal operation point and may determine the gear ratio based on whether each of the first vehicle 100 and the second vehicle 300 corresponds to a hybrid vehicle, an electric vehicle, a diesel vehicle, or a gasoline vehicle.

Figure 14:
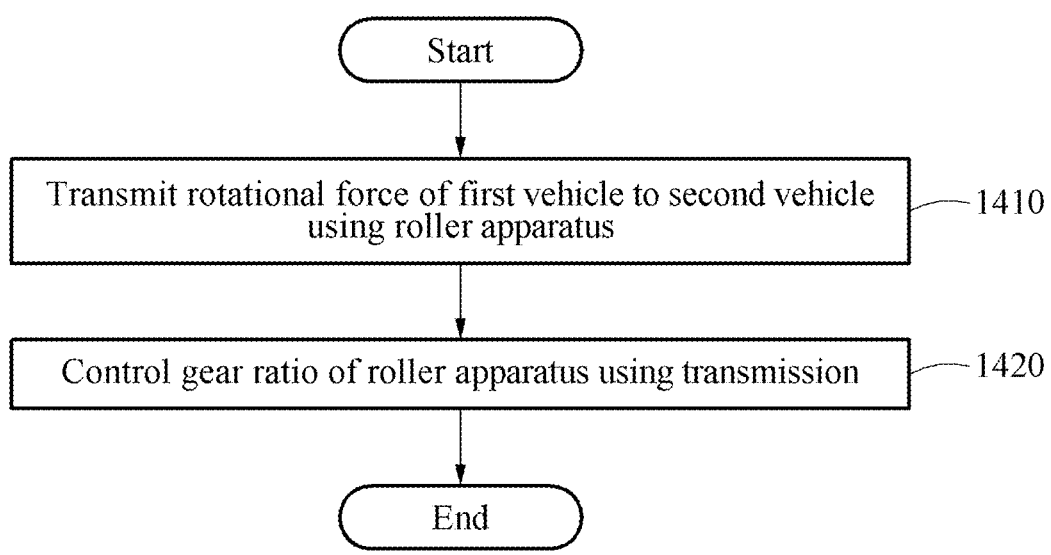
FIG. 14 is a diagram illustrating an example of a charging method.

FIG. 14 is a diagram illustrating an example of a charging method. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. One or more blocks of FIG. 14, and combinations of the blocks, can be implemented by special purpose hardware-based computer that perform the specified functions, or combinations of special purpose hardware and computer instructions. In addition to the description of FIG. 14 below, the descriptions of FIGS. 1-13 are also applicable to FIG. 14, and are incorporated herein by reference. Thus, the above description may not be repeated here.

Referring to FIG. 14, a charging device may charge a second vehicle using a first vehicle.

In operation 1410, the charging device transmits a rotational force of the first vehicle to the second vehicle using a roller apparatus. In an example, the roller apparatus may be provided in a hollow coaxial structure. Accordingly, loss of the rotational force of the first vehicle may be minimized and in this instate, the rotational force of the first vehicle may be transmitted to the second vehicle. The portability of the charging device may be enhanced.

In operation 1420, the charging device controls a gear ratio of the roller apparatus using a transmission. In an example, the transmission is configured as a CVT and infinitely changes the gear ratio. The charging device may determine the gear ratio based on a first optimal operation point of the first vehicle and a second optimal operation point of the second vehicle. Accordingly, the charging device may efficiently transmit the rotational force of the first vehicle to the second vehicle and may quickly charge the second vehicle.

For example, the charging device may determine the first optimal operation point based on a motor efficiency map of the first vehicle and may determine the second optimal operation point based on a motor efficiency map of the second vehicle.

In another example, when the second vehicle or the first vehicle is a hybrid vehicle or an electric vehicle, the charging device may determine a middle-speed-and-middle-torque area of the second vehicle or the first vehicle as a second optimal operation point or the first optimal operation point. Also, when the second vehicle or the first vehicle is a diesel vehicle or a gasoline vehicle, the charging device may determine a middle-speed-and-high-torque area of the second vehicle or the first vehicle as the second optimal operation point or the first optimal operation point.

The charging device 200, controller 210, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated herein that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for charging a second vehicle using a first vehicle, the device comprising:
    a roller apparatus configured to transmit, to the second vehicle, a rotational force generated in response to a rotation of a wheel of the first vehicle;
    a controller configured to control a gear ratio of the roller apparatus; and
    a transmission configured to change the gear ratio in response to an instruction of the controller.

2. The device of claim 1, wherein the transmission is further configured to be a continuously variable transmission (CVT).

3. The device of claim 1, wherein the roller apparatus is provided in a hollow coaxial structure.

4. The device of claim 1, wherein the roller apparatus comprises:
    a first roller configured to rotate in response to the rotation of the wheel of the first vehicle; and a second roller configured to rotate a wheel of the second vehicle.

5. The device of claim 4, wherein the transmission is provided between the first roller and the second roller.

6. The device of claim 4, wherein the transmission is further configured to control a gear ratio between the first roller and the second roller.

7. The device of claim 1, wherein the roller apparatus comprises:
a first inclined plate configured to support the first vehicle; and
a second inclined plate configured to support the second vehicle.

8. The device of claim 1, wherein the controller is further configured to determine the gear ratio based on a first optimal operation point of the first vehicle and a second optimal operation point of the second vehicle.

9. The device of claim 8, wherein the controller is further configured to determine the first optimal operation point based on a motor efficiency map of the first vehicle, and to determine the second optimal operation point based on a motor efficiency map of the second vehicle.

10. The device of claim 8, wherein the controller is further configured to determine a middle-speed-and-middle-torque area of the second vehicle as the second optimal operation point, in response to the second vehicle being a hybrid vehicle or an electric vehicle.

11. A method of charging a second vehicle using a first vehicle, the method comprising:
transmitting a rotational force of the first vehicle to the second vehicle using a roller apparatus; and
controlling a gear ratio of the roller apparatus using a transmission.

12. The method of claim 11, wherein the transmission is a continuously variable transmission (CVT).

13. The method of claim 11, wherein the roller apparatus is provided in a hollow coaxial structure.

14. The method of claim 11, wherein the roller apparatus comprises:
a first roller configured to rotate in response to a rotation of a wheel of the first vehicle; and
a second roller configured to rotate a wheel of the second vehicle.

15. The method of claim 14, wherein the controlling of the gear ratio comprises controlling a gear ratio between the first roller and the second roller.

16. The method of claim 11, wherein the roller apparatus comprises:
a first inclined plate configured to support the first vehicle; and
a second inclined plate configured to support the second vehicle.

17. The method of claim 16, wherein the transmission is provided between the first roller and the second roller.

18. The method of claim 11, wherein the controlling of the gear ratio comprises determining the gear ratio based on a first optimal operation point of the first vehicle and a second optimal operation point of the second vehicle.

19. The method of claim 18, wherein the determining of the gear ratio comprises:
determining the first optimal operation point based on a motor efficiency map of the first vehicle; and
determining the second optimal operation point based on a motor efficiency map of the second vehicle.

20. The method of claim 19, wherein the determining of the gear ratio comprises determining a middle-speed-and-middle-torque area of the second vehicle as the second optimal operation point, in response to the second vehicle being a hybrid vehicle or an electric vehicle.

* * * * *